United States Patent [19]

Pease et al.

[11] Patent Number: 4,842,465
[45] Date of Patent: Jun. 27, 1989

[54] INSULATION HANGER WITH LOCKING DEVICE

[75] Inventors: Charles C. Pease, Vincentown; Eugene P. Schaeffer, Marlton; Kevin L. Bernd, Maple Shade, all of N.J.; David A. Higton, Little Budworth, United Kingdom

[73] Assignee: KSM Fastening Systems Inc., Moorestown, N.J.

[21] Appl. No.: 368,959

[22] Filed: Apr. 16, 1982

[51] Int. Cl.[4] .......................... F16B 21/00; E04B 5/00
[52] U.S. Cl. ..................................... 411/337; 411/529; 411/522; 52/410; 24/597; 24/629
[58] Field of Search ........................ 411/337, 351–355, 411/520–525, 529, 535, 536, 539–546; 24/206 R, 211 L, 597, 629; 248/205.1, 231.1; 52/404, 410, 506, 718

[56] References Cited

U.S. PATENT DOCUMENTS

| | | | |
|---|---|---|---|
| 1,055,440 | 3/1913 | Boden | 24/211 L |
| 1,258,172 | 3/1918 | Winans | 24/211 L |
| 1,337,938 | 4/1920 | Merriam | 24/211 L |
| 1,600,769 | 9/1926 | Marsh | 24/211 L |
| 2,260,048 | 10/1941 | Newell | 411/529 |
| 2,555,291 | 5/1951 | Poupitch | 411/544 |
| 3,387,529 | 6/1968 | Flora | 411/529 |
| 3,606,406 | 9/1971 | Walters | 411/529 |
| 4,018,023 | 4/1977 | Anderson | 52/410 |
| 4,157,001 | 6/1979 | Pickles | 52/410 |

FOREIGN PATENT DOCUMENTS 470472  1/1929  Fed. Rep. of Germany .... 24/211 L

Primary Examiner—Neill R. Wilson
Attorney, Agent, or Firm—Charles F. Duffield

[57] ABSTRACT

An insulation hanger for supporting a compressible insulation blanket upon a supporting wall which is formed of three pieces, the first of which is an end weldable stud welded to the supporting surface and upon which the blanket to be secured is impaled. The end weldable stud includes a plurality of annular grooves of reduced cross section providing a shoulder at the juncture between the groove and the body of the stud. A flat washer like blanket retainer is utilized which has a keyhole aperture which permits the retainer to pass over the stud through a larger hole to compress the blanket and thereafter to be moved translationally to an aperture of size approximating the groove to interlock the blanket retainer with the shoulder of the stud. A retainer lock is positioned over the stud between the blanket and the retainer and, through various configurations, locks the blanket retainer against translational movement relative to the stud preventing unintentional disengagement of the blanket retainer from the stud.

8 Claims, 3 Drawing Sheets

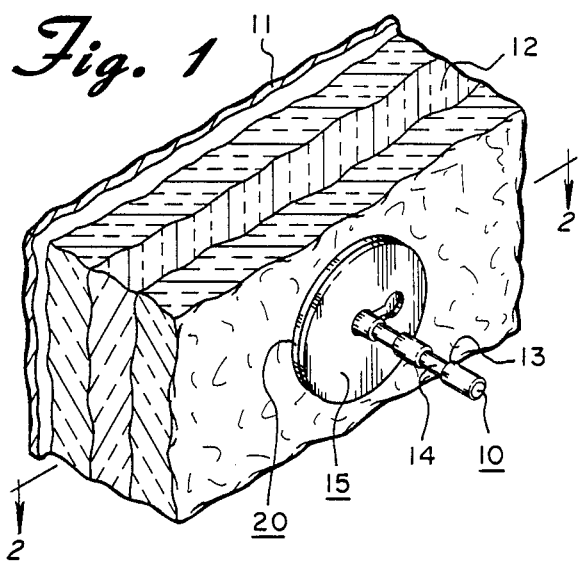
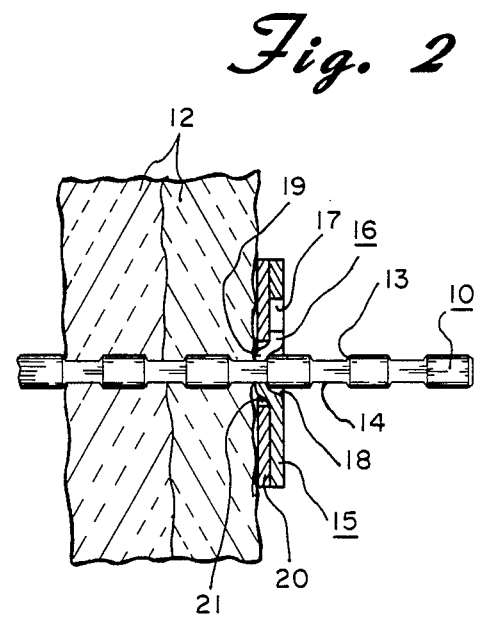
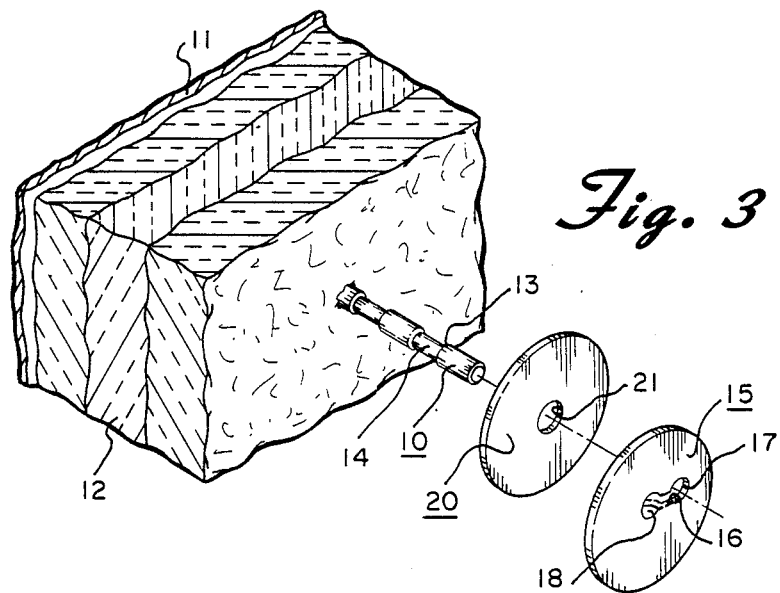
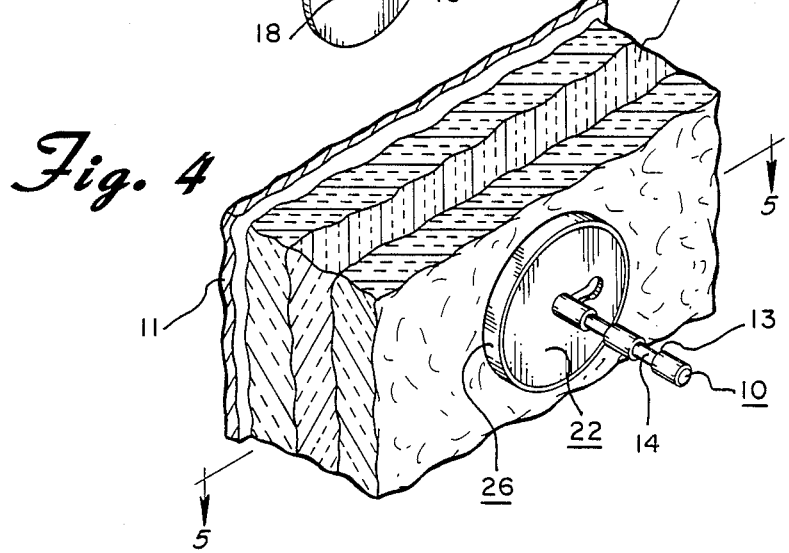

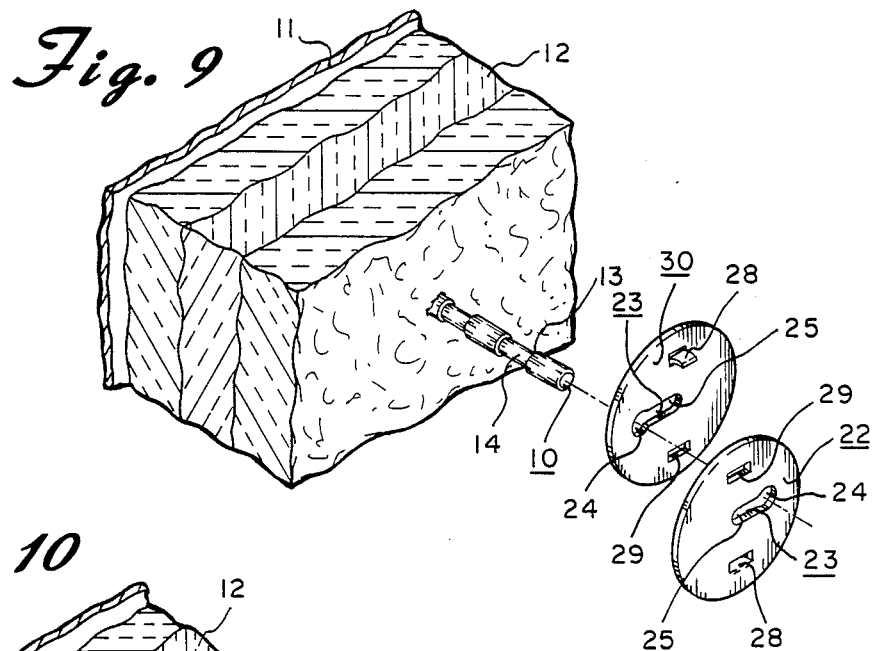
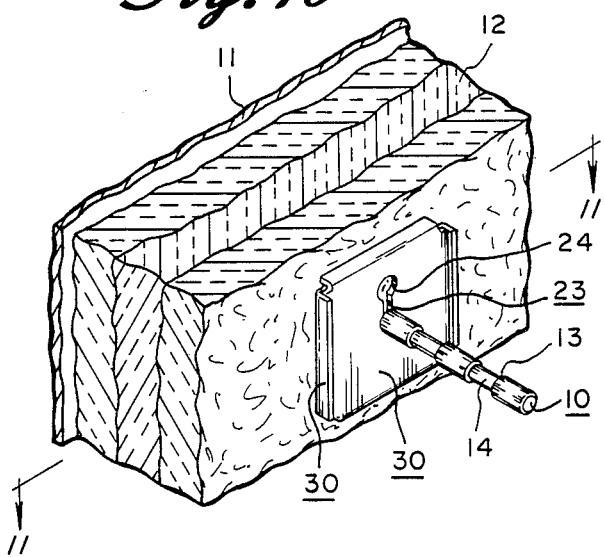
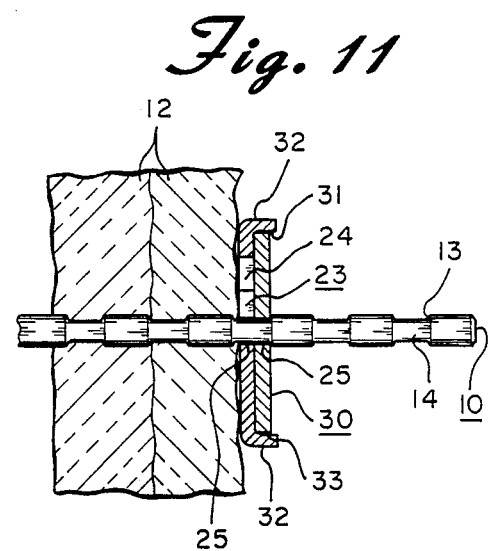
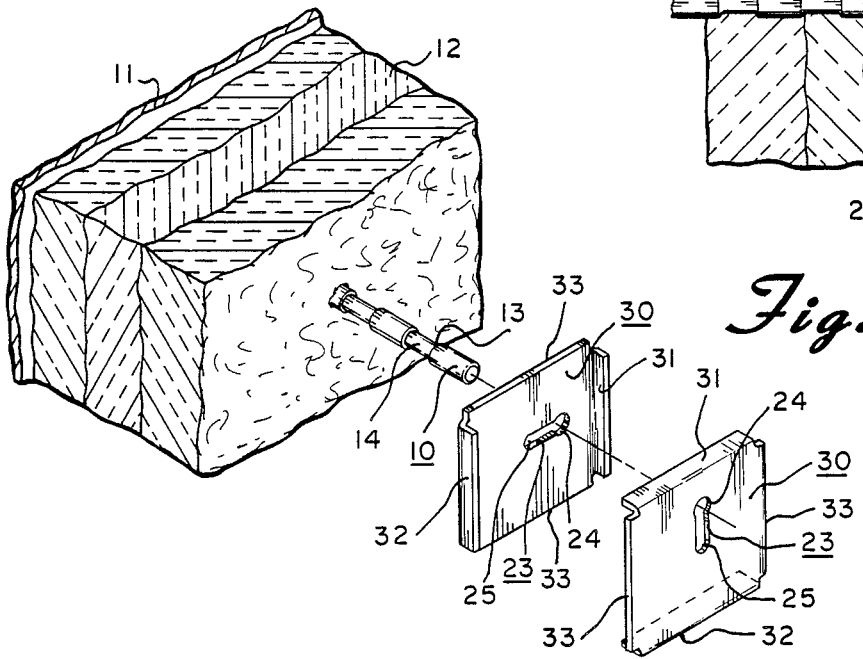

INSULATION HANGER WITH LOCKING DEVICE

BACKGROUND OF INVENTION

The present invention applies to the art of securing insulation to the walls of furnaces, kilns, soaking pits and the like and, more particularly, to securing compressible insulation blankets to the inner walls of such apparatus.

Several years ago the predominant method of insulating such heating apparatus as kilns, soaking pits, process heaters, car bottom furnaces and incinerators and other devices of that nature was to use the heretofore conventional and well known firebrick. The process of bricking the heated areas was expensive from a labor standpoint and extremely time-consuming. Additionally, replacement of the brick lining in the heating devices was both expensive and time-consuming.

More recent developments in the art of insulating kilns and like devices is the utilization of insulation blankets. The insulating blankets are made of varying compositions usually interwoven fibers which contain a high consistency of alumina. The blankets come in varying thicknesses from one to three inches and are formed into rolls of varying widths.

During the insulating process, the blankets are applied to the walls of the kiln or like device in layers of anywhere from one to three layers and often in a criss-cross pattern. The blankets may be secured to the walls of the kiln or like device in a number of different ways.

In nearly all of the heating devices such as kilns and the like, the wall to which the blankets are supported is a metallic wall known as the cold wall. One manner of securing the blankets is the utilization of a threaded fastener which employs a drill point and self tapping combination on the end of the fastener. The fastener is drilled and threaded into the wall and projects outwardly from the wall. A number of these fasteners are spaced along the wall and blankets impaled upon the fasteners. Thereafter, a washer and nut are applied to the threaded fastener to pull the blanket down into secured position.

Another device which is used for smaller blankets is a pin which has a large washer secured on the end of the pin. The pin is pushed through the blanket and against the metal cold wall and stud welded in place to secure the blanket.

A third device in prevalent use is a stud and washer combination wherein the stud includes a plurality of tapered notches. The studs are welded to the cold wall in a given array or fashion and the blanket impaled upon the studs. Thereafter, the washers which have a complementary aperture therein are placed over the stud to compress the blanket and rotated 90° and released whereupon the blanket brings the washer into locking engagement with the stud.

The self tapping threaded fastener type device is both expensive and time-consuming in installation. The pin with the large washer affixed to the end of the pin does not have sufficient holding capabilities for heavier blankets. The stud with the tapered notches and washer combination, while an effective means for securing the insulation blanket, is an expensive combination given the rising costs of stainless steel material of which the combination is manufactured as well as the manufacturing technique involved.

What is required by the industry as a suitable insulation hanger for insulating blanket is an inexpensive hanger both from the standpoint of manufacture and installation as well as one which has a positive lock against unsecuring of the hanger once in place.

SUMMARY OF INVENTION

The insulation hanger of the present invention is designed for use in securing insulation blankets in place on cold walls and includes a three piece combination which consists of an end weldable stud, an insulation retainer designed to be positioned upon the stud and a retainer lock designed to be positioned between the insulation and the insulation retainer to prevent disengagement of the insulation retainer from the stud.

The stud is an elongate stud which is designed to be welded by the stud end welding technique to the supporting wall or cold wall of the kiln or the like. The stud includes a plurality of shoulders along the length thereof which provides a plurality of areas of increased and alternately decreased cross section of the stud. Once the stud is welded in place, the layer or layers of insulation blanket are impaled over the stud.

An insulation retainer is provided which is substantially flat. The insulation retainer includes a keyhole aperture therein which has a first portion thereof of size to permit the insulation retainer to be passed downwardly over the stud into compressed engagement with the insulation blanket. A second portion of the keyhole aperture is of size small enough and in communication with the first portion such that, upon translational movement of the insulation retainer when positioned upon the area of reduced cross section of the stud, the second portion will engage the shoulder of the stud and lock into engagement therewith against outward movement under the pressur of the insulating blanket.

A retainer lock is provided which includes an aperture therein permitting the retainer lock to be positioned upon the stud and against the insulating blanket between the insulating blanket and the insulation retainer. The retainer lock is formed of different configurations to provide an interlock between the retainer lock and the insulation retainer to prevent the insulation retainer from reversing its translational movement to permit disengagement of the insulation retainer from the shoulder of the stud.

The interlock between the retainer lock and insulation retainer, in one embodiment, is a projecting socket on the insulation retainer which cooperates with the retainer lock aperture of the retainer lock. In a second embodiment the interlock is accomplished by means of a circular perimetral flange on the retainer lock which engages the complementary flange of the insulation retainer. In a third embodiment, the interlock is accomplished by cooperating projecting tangs and complementary apertures on the retainer lock and insulation hanger. Finally, in a fourth embodiment, the interlock is accomplished by means of perimetral flanges on the retainer lock and insulation retainer which engage the perimeter of the opposing member to provide interlock against translational movement.

DETAILED DESCRIPTION OF DRAWINGS

FIG. 1 is a perspective view of a first embodiment of the insulation hanger of the present invention in assembled relationship with an insulation blanket;

FIG. 2 is an elevational view partially in section of the embodiment of FIG. 1;

FIG. 3 is a perspective exploded view of the insulation hanger of the embodiment of FIG. 1;

FIG. 4 is a perspective view of a second embodiment of the insulation hanger of the present invention in assembled relationship in respect to an insulation blanket;

FIG. 9 is an exploded perspective view of the embodiment of insulation hanger shown in FIG. 7;

FIG. 10 is a perspective view of a fourth embodiment of the insulation hanger of the present invention shown in assembled relationship in respect to the insulating blanket;

FIG. 11 is an elevational view partially in section of the embodiment shown in FIG. 10; and FIG. 12 is an exploded perspective view of the embodiment of insulation hanger shown in FIG. 10.

DETAILED DESCRIPTION OF INVENTION

Figure 5:
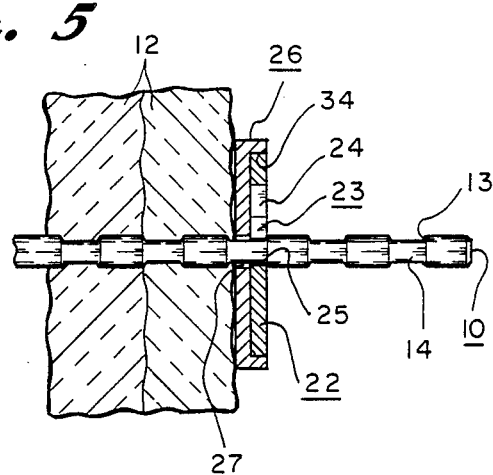
FIG. 5 is an elevational view partially in section of the embodiment of FIG. 4.

A first embodiment of the three piece insulation hanger of the present invention is shown in FIGS. 1-3 of the drawings. As heretofore described, a stud 10 is welded to a supporting wall or cold wall 11 of the kiln or furnace by the stud end welding technique. Thereafter, an insulating blanket or, as shown in FIGS. 1-3, three layers of insulating blanket are impaled upon the stud and positioned against the supporting wall 11.

The stud 10 is of length in excess of the anticipated combined thickness of the various insulating blankets and thus, projects a distance beyond the outer most layer of the insulating blanket 12.

The stud 10 includes a plurality of shoulders 13 formed along the length of the stud. The shoulders 13 may be formed by means of annular grooves 14 rolled into or otherwise formed into the stud 10. In this manner, the stud has a first and larger cross-sectional area with alternating second and smaller cross-sectional areas wherein the first and second cross-sectional areas join one another at the shoulders 13.

The shoulders 13 may be formed by rolling a stud of uniform cross section in a manner to provide indented annular grooves together with raised portions beyond the beginning cross section of the stud adjacent the annular groove. The result is essentially the same in that the stud will have a first cross section of a larger cross-sectional area adjoining a second cross section of smaller cross-sectional area by means of a shoulder. An example of such mechanical forming of a stud would be to start with a stud of approximately 3/16" diameter and rolling the notches to a depth of approximately 0.025" with a rollup of approximately 0.25 to a side with a total difference in diameter of the first and second cross-sectional areas of approximately 0.100".

The first embodiment of insulation hanger shown in FIGS. 1-3 includes an insulation retainer 15. The insulation retainer is a flat washer like device and includes a keyhole aperture 16 generally centrally thereof.

The keyhole aperture 16 includes a first portion of the aperture 17 which is of a size large enough to fit over the larger or first cross-sectional area of the stud 10. The keyhole aperture 16 further includes a second portion 18 of the keyhole aperture 16 which is a projecting socket 19. The bottom of the projecting socket is of a size sufficient to fit over the smaller second cross-sectional area of the stud behind the shoulder but smaller than the shoulder itself such as to lock on the shoulder as shown in FIG. 2.

The first embodiment of insulation hanger shown in FIGS. 1-3 further includes a retainer lock 20. The retainer lock 20 includes generally centrally thereof a retainer lock aperture 21.

As may best be seen in FIG. 2, the retainer lock aperture 21 is of a size such as to fit over the larger first cross-sectional area of the stud 10 with slight clearance thereof. Further, the retainer lock aperture 21 and the projecting socket 19 are of a complementary configuration such that the outer perimeter of the projecting socket 19 will fit into the retainer lock aperture 21 as shown in FIG. 2.

During assembly, the insulation blanket 12 is impaled upon the stud 10 after the stud is welded in place. Thereafter, the retainer lock 20 is passed over the stud next followed by the insulation retainer 15 by means of the stud passing through the first portion 17 of the keyhole aperture 16. The insulation retainer 15 and retainer lock 20 are pressed against the insulation until sufficient compression has been achieved and the keyhole aperture 16 is in alignment with the smaller second cross-sectional area of the stud 10. Thereafter, the insulation retainer 15 is moved in a translational direction across the axis of the stud 10 until the shoulder of the stud slips into the projecting socket 19. Concurrently, the projecting socket 19 will slip into engagement with the retaining lock aperture 21 of the retainer lock whereupon pressure is released from the assembly and the insulation blanket will push against the retainer lock 20 which, in turn, will push against the insulation retainer 15 maintaining the latter two together.

When the assembly is in place, the pressure of the insulation blanket 12 against the retainer lock 20 will maintain the retainer lock 20 against the insulation retainer 15. By means of the interlock between the retainer lock aperture 21 with the projecting socket 19, the insulation retainer 15 is locked against translational movement from the smaller second portion 18 of the keyhole aperture to the first portion 17 of the keyhole aperture 16 which would permit unlocking or disengagement of the insulation retainer 15 from the shoulder 13 of the stud 10.

The projecting socket 19 in its engagement with and up over the shoulder 13 of the stud provides a first interlock against translational movement of the insulation retainer 15 upon the stud 10 with consequent disengagement. The cooperation of the retainer lock aperture 21 with the projecting socket 19 provides a further security against accidental disengagement in that, before disengagement can occur, the insulation blanket must shrink or otherwise be compressed to a degree to first move the insulating retainer 15 inwardly toward the supporting wall a distance to disengage from the shoulder and thereafter, a further distance such that the retainer lock 20 will become disengaged from the projecting socket 19.

Figure 6:
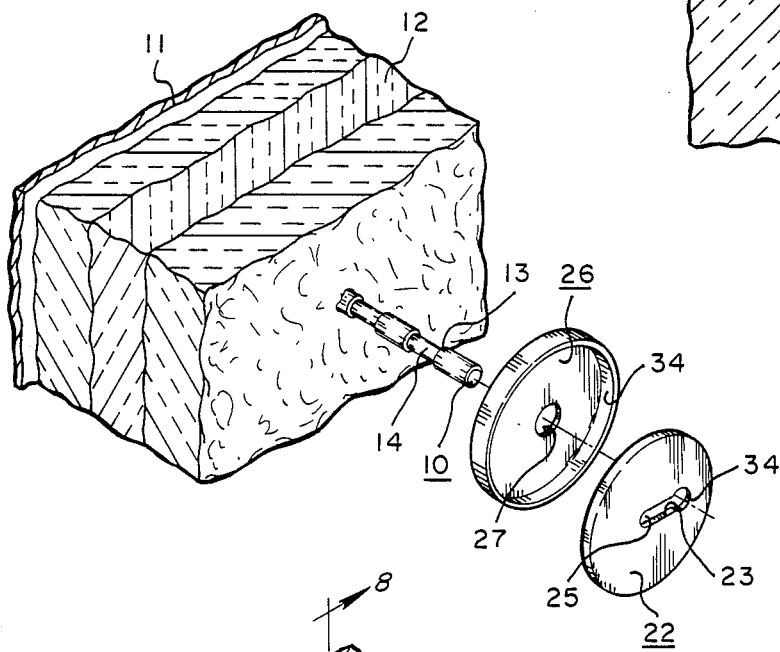
FIG. 6 is an exploded perspective view of the insulation hanger of the embodiment of FIG. 4.

A second embodiment of the three piece insulation hanger of the present invention is shown in FIGS. 4-6 of the drawings. The stud 10 and its assembly to the supporting wall 11 and support of insulation blanket 12 are identical to the embodiment shown in FIGS. 1-3 of the drawings.

In the second embodiment, an insulation retainer 22 is utilized which has a keyhole aperture 23 having a first portion of the aperture 24 and a second portion of the aperture 25 of substantially identical configuration to the keyhole aperture 16 of the first embodiment with the exception that the keyhole aperture 23 does not include a projecting socket 19 as shown in the embodiment of FIGS. 1-3. However, the sizing of the second portion 25 of the keyhole aperture 23 is such that it will fit over the second and smaller cross-sectional area of the stud 10 and engage the shoulder 13 of the stud in the manner of the first embodiment shown in FIGS. 1-3.

The second embodiment shown in FIGS. 4-6 further includes retainer lock 26 with a retainer lock aperture 27 which is identical to the retainer lock 20 of the first embodiment shown in FIGS. 1-3 except for the addition of a circular perimetral flange 34. The inner diameter of the perimetral flange 34 is slightly larger than the diameter of the insulation retainer 22 and the flange 34 which forms a dish shaped retainer lock will permit the insulation retainer 22 to fit within the flange 34.

Assembly of the insulation hanger of the second embodiment shown in FIGS. 4-6 is substantially that as in the first embodiment shown in FIGS. 1-3. Following compression of the insulation, the insulation retainer 22 is moved translationally to the stud from the first portion 24 of the keyhole aperture 23 to the second portion 25 of the keyhole aperture 23 whereupon the flat insulating retainer 22 will come into locking engagement with the shoulder 13 of the stud and, simultaneously, the flat insulation retainer 22 will slip into mating engagement with the circular perimetral flange 34 of the retaining lock 26 as shown in FIG. 5. In this manner translational movement and unlocking of the insulation retainer 22 from the stud 10 is prevented unless and until the insulation 12 is compressed a sufficient distance to permit the retainer lock 26 to move toward the supporting wall a sufficient distance for the circular perimetral flange 34 to disengage the perimeter of the insulating retainer 22.

Figure 7:
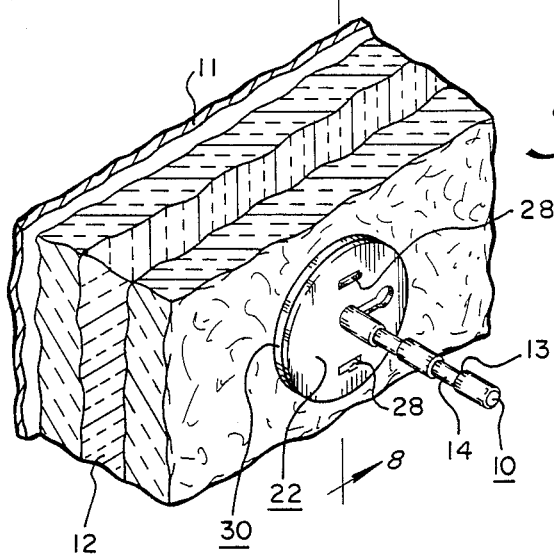
FIG. 7 is a perspective view of a third embodiment of the present invention in assembled relationship in respect to the insulation blanket.
Figure 8:
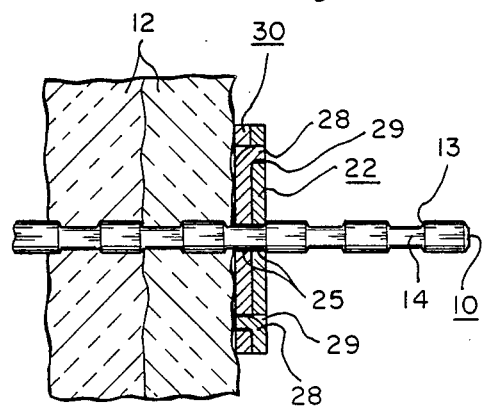
FIG. 8 is an elevational view partially in section of the embodiment of FIG. 7.

A third embodiment of insulation hanger of the present invention is shown in FIGS. 7-9 of the drawings. In the third embodiment, the stud and its method of being affixed to the supporting wall and of supporting the insulation 12 is identical to the first and second embodiments. The third embodiment includes an insulation retainer 22 which is identical to the insulation retainer of the second embodiment except for the addition of a projecting tang 28 and a cooperating complementary aperture 29 formed to either side of the keyhole slot 23.

In the third embodiment of the present invention shown in FIGS. 7-9, the retainer lock 30 is substantially identical to the insulation retainer 22 used in that embodiment in that it likewise is of a substantially flat configuration and includes a keyhole aperture 23 which is identical to the keyhole aperture 23 of the insulation retainer 22 and includes the first portion 24 of the keyhole aperture 23 and the smaller second portion 25 of the keyhole aperture 23.

The retaining lock 30 further includes a projecting tang 28 and a cooperating complementary aperture 29 as the insulation retainer 22. However, the projecting tang 28 and cooperating complementary aperture 29 are positioned with respect to the keyhole aperture 24 of the retainer lock 30 180° out of position with respect to the same elements on the insulation retainer 22. In this manner, when the projecting tangs of both the insulation retainer 22 and the retaining lock 30 are positioned to be facing one another and the keyhole apertures aligned 180° from one another, the projecting tang of one element will mate with the cooperating complementary aperture of the other element to provide a rotational interlock between the two elements.

Assembly of the insulation hanger of the third embodiment is accomplished by inserting both the retainer lock and the insulation retainer over the stud by means of the first portion of the apertures until approximate compression of insulation is achieved and the retainer lock and insulation retainer are in the area of the second and smaller crosssectional area. Thereupon, the two members may be translationally moved upon the stud to the second and smaller portion 25 of the keyhole aperture 23 at which point the elements will lock behind the shoulder of the stud and, simultaneously, the mating projecting tangs and cooperating complementary apertures will come into mating engagement to provide interlock against translational movement of both the retainer lock and the insulation retainer thus guarding against unintentional disengagement of the members until the insulation is compressed and the members separated from one another disengaging the interlock.

The fourth embodiment of the three piece insulation hanger of the present invention is shown in FIGS. 10-12 of the drawings. In the fourth embodiment, the stud 10 and the manner in which it is affixed to the supporting wall 11 and the insulation blanket 12 impaled thereupon are identical as in the prior three embodiments.

In the fourth embodiment, the insulation retainer 30 is a substantially square flat member. The insulation retainer 30 includes a flat keyhole 23 having a first portion 24 and a second portion 25 all dimensioned identical to the keyhole 23 in the second and third embodiments.

The insulation retainer 30 in the fourth embodiment includes a projecting flange 31 adjacent the first portion 24 of keyhole 23 and, optionally, a further projection 32 on the opposite end of the insulation retainer 30. The distance between the inner edges of the projections 31 and 32 is slightly larger than the width of the insulation retainer 30 between its side edges 33.

In the fourth embodiment shown in FIGS. 10-12, the retainer lock is an element identical to the insulation retainer 30 in all respects. When the retainer lock and insulation retainer in the fourth embodiment, being identical to one another, are aligned 90° to one another as respects the keyhole apertures 23, the projecting flanges 31 and 32 of one element pass over and engage the side edges 33 of the opposed member when the two members are brought together.

Assembly of the insulation retainer of the fourth embodiment is accomplished by passing the retainer lock and insulation retainer over the stud by means of the first portions 24 of the keyhole apertures 23 until sufficient compression of the insulation is achieved and the elements are in the position of the smaller second cross-sectional area of the stud. At this point, the retaining lock and insulation retainer are positioned 90° with respect to one another and moved translationally upon the stud until the second portions 25 of the keylock apertures 23 engage the smaller and second cross-sectional area of the stud. Upon release of the elements, the pressure of the insulation will force the retaining lock against the insulation retainer bringing the second portion 25 of the keylock 23 against the shoulder of the stud locking the insulation retainer in place upon the shoulder. Simultaneously, the pressure of the insulation forces the retainer lock against the insulation retainer whereupon the flanges 31 and 32 of both elements will pass over the side edges 33 of the opposing element providing an interlock of the two members one to another against further translational movement and consequent disengagement from the stud.

In all four embodiments of the insulation hangers of the present invention, the stud is preferably of a stainless steel material as well as the insulation retainers. The retainer lock may likewise be of a stainless steel material in all four embodiments although a ceramic material may well suitably be used for the retainer lock of the first and second embodiments. Additionally, the insulation retainer in the first and second embodiments need not necessarily be round, as shown in the drawings, but may be formed of a stip of material having parallel sides.

From the foregoing disclosure of the four embodiments of the present invention, it is to be appreciated that the three piece insulation hanger of the present invention provides one which may be manufactured cheaply and installed easily and further one which provides a positive interlock from unintentional disengagement of the insulation retainer from the stud.

The insulation hanger of the present invention has been described in respect to the particular embodiments set forth in the specification and shown in the drawings. No limitation as to the scope of the invention is intended by the description thereof in respect to particular embodiments set forth in the specification and in the drawings but the scope of the invention is to be interpreted in view of the appended claims.

What is claimed is:

1. An insulation hanger for supporting a compressible insulation blanket to a supporting wall comprising:

an elongate end weldable stud of a first cross section adapted to be secured at one end to the supporting wall and over which the insulation blanket is to be positioned;

a plurality of stud shoulders of reduced cross section along at least a portion of the stud;

a substantially flat insulation blanket retainer having an aperture therein which includes a first portion thereof large enough to permit the retainer to pass over the first cross section of the stud when in a first position to a given shoulder to provide desired compression of the blanket axially of the stud and an adjacent second portion of size to interlock with the stud shoulders upon movement of the retainer translationally of the stud axis to a second position to secure the blanket; and separate retainer locking means adapted to be positioned over the stud and between the retainer and insulation blanket and held into contact with the retainer by the compressed insulation blanket for preventing movement of the retainer between its second and first positions preventing undesired unlocking of the retainer from the stud.

2. The insulation hanger of claim 1, wherein the retainer locking means prevents translational movement of the retainer when engaged with the retainer under the influence of the compressed blanket.

3. The insulation hanger of claim 2 wherein the second portion of the retainer aperture includes a projecting socket into which the stud shoulder is received and wherein the retainer locking means is substantially flat and includes an aperture of configuration to permit the locking means to jointly pass over the stud by means of the aperture and the aperture to engage the projecting socket.

4. The insulation hanger of claim 2 wherein the retainer locking means is substantially flat and includes an aperture of configuration permitting the locking means to pass over the stud by means of the aperture and wherein the locking means includes perimetral means for engaging the perimeter of the retainer.

5. The insulation hanger of claim 4 wherein the retainer is washer shaped and the locking means is dish shaped.

6. The insulation hanger of claim 2 wherein the locking means is substantially flat and includes an aperture of the configuration of the aperture of the retainer and wherein at least the retainer or locking means includes mutually engaging means coupling the retainer and locking means against relative rotational movement one to another when the apertures of each are perpendicular to one another and engaging one another.

7. The insulation hanger of claim 6 wherein the mutual engaging means includes at least one projecting tang and cooperating complementary aperture on one or the other of the retainer and locking means.

8. The insulation hanger of claim 6 wherein the mutual engaging means includes at least one perimetral flange on the retainer and locking means engaging the perimeter of the opposed retainer or locking means.

* * * * *